C. M. L. MOSESON.
FRITION CLUTCH.
APPLICATION FILED DEC. 9, 1909.

951,485.

Patented Mar. 8, 1910.

Witnesses
R. D. Tolman
Penelope Cumberbach

Inventor
Charles M. L. Moseson
By Rufus B. Fowler
Attorney

UNITED STATES PATENT OFFICE.

CHARLES M. L. MOSESON, OF FITCHBURG, MASSACHUSETTS.

FRICTION-CLUTCH.

951,485.

Specification of Letters Patent.

Patented Mar. 8, 1910.

Application filed December 9, 1908. Serial No. 466,638.

*To all whom it may concern:*

Be it known that I, CHARLES M. L. MOSESON, a citizen of the United States, residing at Fitchburg, in the county of Worcester and Commonwealth of Massachusetts, have invented a new and useful Improvement in Friction-Clutches, of which the following is a specification, accompanied by drawings forming a part of the same, in which—

Figure 1:
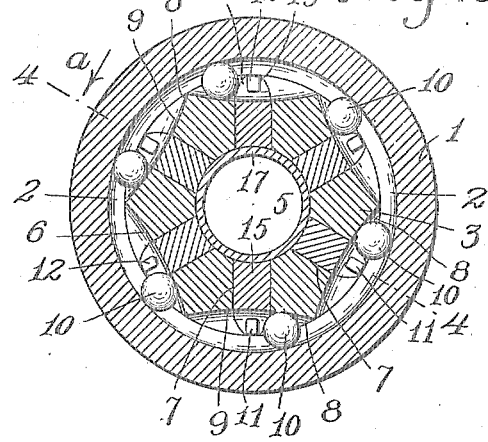
Figure 2:
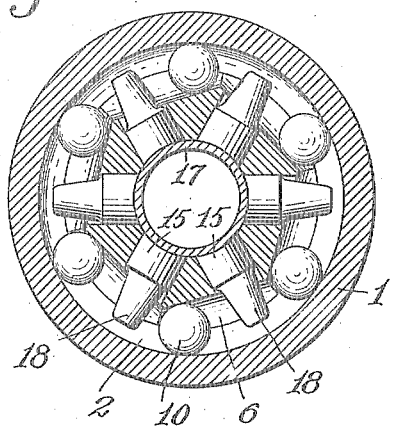
Figure 3:
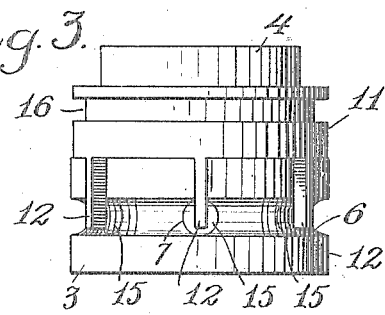
Figure 4:
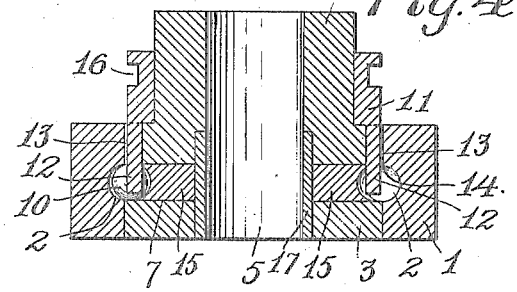

Figure 1 is a transverse section of my improved clutch. Fig. 2 is the same showing a modified form adapted for a drive in one direction only. Fig. 3 is a side view of the inner member and sliding sleeve. Fig. 4 is a section on line 4—4, Fig. 1, looking in the direction of the arrow *a*.

Similar reference letters and figures refer to similar parts in the different views.

My invention relates to a clutch mechanism comprising a driving and a driven member in which the connection is made by the wedging action of balls or rollers between opposing surfaces on the driving and driven members, and also embraces means by which either forward or backward motion of the driving member may be communicated through the friction connection, to the driven member, and it consists in the construction and operation of parts as hereinafter described and pointed out in the annexed claims.

Referring to the accompanying drawings 1 denotes the annular outer member of the clutch, having an internal groove 2 semi-circular in cross section. This annular outer member 1 is arranged to inclose the periphery of the inner member 3, which is provided with a hub 4. Either the outer or inner member may be employed as the driving or the driven member, as desired. A circular opening 5 extends through the inner member 3 and communicates with a corresponding groove 6 on the periphery of the member 3 by radial openings 7. The bottom of the groove 6 is provided with cam surfaces 8 midway between each opening 7, thereby forming shallower portions 9 of the groove 6, and a ball or roller 10 is arranged to be inserted through each opening 7, and by a wedging action between the shallower portion 9 of the peripheral groove 6 and the surface of the internal groove 2 in the outer member 1 connect the members 1 and 3.

A sliding member 11 is arranged to slide at the pleasure of the operator on the hub 4 and is provided with fingers 12 arranged to enter slots 13 in the wall 14 of the peripheral groove 6, and a pin 15 is arranged to be inserted in each opening 7 after the balls have been inserted in the groove 6 through the opening 7 from the transverse opening 5. The pins 15 prevent the return of the balls through the radial openings 7 and the fingers 12 of the sleeve 11 are arranged to provide for the reversal of the movement of the clutch, as will be hereafter pointed out. The sleeve 11 is provided with a peripheral groove 16 whereby connection is made with mechanism for accomplishing its sliding movement, not shown. An internal sleeve 17 is arranged within the central opening 5 to close the radial openings 7.

The operation of my improved clutch is as follows:—The clutch is assembled by the insertion of balls through the radial openings 7 which are then closed by the pins 15 which are held in place by the internal sleeve 17. The sliding sleeve 11 is then arranged with its fingers 12 inserted in the slots 13, thereby providing stops for the backward movement of the balls 10 in the groove 6 when the clutch is inoperative. The balls are, however, constantly in contact with and inclosed by the surfaces of the grooves 2 and 6, and upon a forward movement of the member which may be acting as a driving member, they are carried into the shallower portions 9, thereby forming a friction connection between the driving and the driven member. If for any reason the speed of the driven member exceeds that of the driving member the balls 10 are carried back against the fingers 12 and the driving member is disconnected from the driven member. My improved clutch may, therefore, be employed as the connection between the rear wheels of a motor vehicle and the driving axle, the clutch connection permitting the more rapid rotation of one wheel than the axle and obviating the use of differential gearing in the driving mechanism.

I also provide means for imparting both a forward and a backward movement, or movement in opposite directions, through my clutch connection from the driving to the driven member. As shown in Fig. 1, the cam surfaces 8 are arranged on either side of the radial openings 7, through which the ball is inserted and the finger 12 on the sliding member 11 is arranged to prevent the ball from traversing the entire groove. In Fig. 1, if the outer member were the driving member, and moving in the direction of the arrow *a*, the inner member would be driven, if the balls 10 were on the same side of the fingers 12 as the direction of motion, as shown in Fig. 1. If it was desired to reverse the movement of the driven inner member to correspond with a reversing of the outer member, the sliding member 11 would be drawn out by the operator and upon the reverse movement of the outer member the balls would be carried past the position of the fingers 12 into contact with the opposing cam surfaces of the groove 6, and the inner member would begin to move in the opposite direction to correspond with the reverse movement of the outer member. The sliding member 11 is then returned to its original position with the fingers 12 in the slots 13.

Fig. 2 shows the form of pin and groove employed when the reverse is not desired in the clutch. The sliding sleeve 11 and the slots 13 are omitted and a projection 18 is provided on the pin 15' to prevent the backward movement of the ball. It is also obvious that rollers might be substituted for the balls by slight changes in the shape of the grooves 2 and 6.

I claim,

1. A friction clutch comprising separate members, one of said members having a curved surface on its periphery and the other of said members having an opposing curved surface thereby forming a groove, said first member having a central opening and a number of radial passages connecting said central opening with said groove, said peripheral curved surface arranged to approach said opposing curved surface between said radial passages, a separate rolling member arranged to be inserted through each radial passage, and means for preventing the return of said rolling member through said radial passage.

2. A friction clutch comprising separate members, one of said members having a peripheral curved surface and the other of said members having an opposing curved surface thereby forming a groove, said first member having a central opening and a number of radial passages connecting said central opening with said groove, said peripheral curved surface being arranged to approach said opposing curved surface between said radial passages, a separate rolling member arranged to be inserted through each radial passage, and means for closing said radial passages, said means also arranged to limit the backward rotation of said rolling members in said groove.

3. In a friction clutch, the combination with a member provided with a curved surface on its periphery arranged to project at intervals thereby forming cam surfaces, an outer concentric annular member with an opposing curved surface, said first member having a single central opening and a separate radial passage for each projection in said peripheral curve for the insertion of a ball, a ball arranged to be inserted through each radial passage, and removable means for limiting the backward rotation of each ball.

4. A friction clutch comprising a member having a curved surface on its periphery having cam surfaces at intervals, and an annular member having an opposing internal curved surface, said curved surfaces forming a groove, with said first member having a central opening and radial openings corresponding with said cam surfaces connecting said central opening and said groove for the insertion of balls, pins fitting said radial openings and a sleeve fitting said central opening, and means for limiting the backward rotation of said balls.

CHARLES M. L. MOSESON.

Witnesses:
PENELOPE COMBERBACH,
HENRY WOOD FOWLER.